United States Patent [19]
Haun et al.

[11] Patent Number: 5,164,875
[45] Date of Patent: Nov. 17, 1992

[54] ADDRESSABLE RELAY MODULE FOR CIRCUIT BREAKERS

[75] Inventors: Andy A. Haun; Earl J. Tessmer; Ronald L. Farrington, all of Cedar Rapids, Iowa

[73] Assignee: Square D Company, Palatine, Ill.

[21] Appl. No.: 629,921

[22] Filed: Dec. 19, 1990

[51] Int. Cl.$^5$ .............................................. H02H 3/00
[52] U.S. Cl. ........................................ 361/64; 361/81; 307/38; 307/115; 340/639
[58] Field of Search .................. 307/18, 38, 112, 115; 361/64, 68, 81; 340/638, 639, 644, 310 R, 505, 518, 825.21, 825.52, 825.16, 825.1, 825.07

[56] References Cited

U.S. PATENT DOCUMENTS

| Re. 30,986 | 6/1982 | Sibley | 364/900 |
|---|---|---|---|
| 4,358,810 | 11/1982 | Wafer | 340/644 |
| 4,410,883 | 10/1983 | Swiston | 340/310 R |
| 4,562,550 | 12/1985 | Beatty | 364/492 |
| 4,686,630 | 8/1987 | Marsland | 364/492 |
| 4,737,617 | 4/1988 | Payne | 340/588 |
| 4,972,290 | 11/1990 | Sun | 361/64 |
| 4,974,199 | 11/1990 | Verbanets | 364/900 |
| 4,996,646 | 2/1991 | Farrington | 361/71 |

Primary Examiner—Steven L. Stephan
Assistant Examiner—Adolf Berhane
Attorney, Agent, or Firm—Kareem M. Irfan; Robert J. Crawford

[57] ABSTRACT

An addressable relay module is provided for controlling a plurality of relay outputs associated with an electronic circuit breaker system using a trip unit for monitoring system functions or network parameters. The relay module is linked to a multi-drop serial communications network through which data pertaining to system functions is relayed to and from a communications microcontroller which controls the operational status of relay contacts linked thereto. The microcontroller addresses specific ones of associated relay outputs in accordance with address information contained within the network data. The addressable relay module effectively maps the plurality of relay contact outputs linked thereto to a corresponding plurality of network device parameters received through the multi-drop network.

14 Claims, 6 Drawing Sheets

ADDRESSABLE RELAY MODULE FOR CIRCUIT BREAKERS

BACKGROUND OF THE INVENTION

1. Field of the Invention

The present invention generally relates to digital protective circuit breaker systems. More particularly, this invention relates to addressable control of relay outputs in electrical distribution systems using a network of electronic circuit breakers.

2. Description of the Prior Art

Applications of microprocessors to protective (circuit breaker systems are well known and are becoming increasingly popular for use with electrical power distribution systems. Typically, in such systems, power system data corresponding to pertinent voltages and currents is derived from the power system and converted into corresponding digital values using conventional converters, sample/hold circuits, multiplexers, and analog/digital (A/D) converters. The digitized data or relay inputs are subsequently applied to some form of digital processing device which includes a direct memory access (DMA) controller linked to a data/program memory, and a central processing unit (CPU) where discriminating operations of the respective protective elements are carried out on the basis of the input data supplied thereto and in accordance with predefined programs stored in the system memory.

The use of microprocessors in such systems permits sequential logical processing at high speeds to control the operation of the various relays associated with the protective system by logically combining the results of the discriminating operations and delivering a controlling output to each of the associated circuit breaker elements. The high speed capability of the microprocessors used in such protective systems makes the systems capable of performing discriminating operations for a plurality of protective elements, as well as complicated logical operations.

In electronic circuit breaker systems, trip units and the like using microprocessors are utilized for automatically monitoring line current and related parameters for the presence of predefined conditions such as over-current faults, ground current faults, short circuits, etc. whereupon an associated circuit breaker is "tripped" on the basis of an appropriate output signal generated by the trip unit. Data output from the trip unit generally constitutes trip unit protection, configuration and operating condition information in the form of a continuous uni-directional stream of data which is used for controlling the operational status of the circuit breakers associated with the trip unit.

In addition to controlling the action of circuit breakers, it may be desirable in digital protective systems to control the status of one or more associated relays on the basis of circuit breaker trip information from the trip unit. Such relays may be used to realize a variety of functions such as alarm, display, or programmable functions related to the imminent tripping of a circuit breaker. With conventional trip unit systems for circuit breakers, this type of relay control is difficult and complicated, particularly in "fault-powered" systems where the trip system circuitry draws power from the main line current and, accordingly, a limited amount of time is available for the trip system to perform its functions following detection of a line fault; this is because the resultant tripping of the circuit breaker also removes power to the trip system.

This problem has been approached by the provision of an adapter device in the form of a microcontroller which reads the incoming data stream from a trip unit and clusters, reformats and distributes the information on a multi-drop network based on a multi-drop communications protocol aimed at realizing data exchange without conflicts. Details pertaining to a preferred implementation of such an adapter are disclosed in Haun, et al., U.S. Pat. application Ser. No. 07/585,449, entitled "Communications Arrangement for an Electronic Circuit Breaker Trip System," which is also assigned to the assignee of the present application, Square D Company; the disclosure in that application is incorporated herein by reference.

A major problem associated with conventional trip unit systems is the lack of flexibility with respect to the network parameters of the electrical system being protected which may be used as the basis for controlling the output state of the plurality of relays associated with the system. Even with a system of the above-noted type using a multi-drop network-based adapter, there is a need for efficiently addressing a plurality of relays associated with specific circuit breakers. In addition, an inordinately large number of control lines are required to effectively link the electronic circuit breakers used with the system to the relay controller module in order to realize the necessary relay control. Accordingly, system installation is complicated and system cost is correspondingly increased.

There, accordingly, exists a distinct need for a simple and economical digital protective circuit breaker/relay system providing efficient addressability and increased system flexibility from the user viewpoint by permitting convenient mapping of relay control parameters.

SUMMARY OF THE INVENTION

In view of the foregoing, it is a primary object of the present invention to provide a digital protective circuit breaker/relay system which is both economical and easily installed, and yet provides efficient addressability and increased system flexibility in controlling the output state of plural relays associated with the system.

In this regard, it is an object of the present invention to provide an addressable relay module for electronic circuit breaker systems which is capable of mapping a plurality of relay outputs to a corresponding plurality of network device parameters.

An associated object of this invention is to provide such an addressable relay module which requires a reduced number of control lines from the system circuit breakers for operating the associated plurality of relay outputs.

A further object of the present invention is to provide an addressable relay module of the above type which can provide the requisite control over the relay outputs from a location remote from the associated circuit breakers.

It is a further object of this invention to provide such an addressable relay module which is capable of operating in field-selectable network master/slave modes and, accordingly, is particularly adapted for operation in single point-to-point applications.

Briefly, in accordance with the principles of the present invention, the above and other objects are realized by the provision of an addressable relay module capable of controlling a plurality of relay outputs associated with an electronic circuit breaker system, using an electronic trip unit of the conventional type which is adapted to monitor a plurality of system functions or network parameters.

According to a preferred embodiment, the relay module is linked to a multi-drop serial communications network through which data pertaining to the network parameters is relayed to and from a communications microcontroller for controlling the operational status of the relays which are associated with the circuit breaker system and are linked to the relay module. The arrangement is such that the addressable relay module maps the plurality of relay outputs linked thereto to a corresponding plurality of network device parameters relayed through the multi-drop network.

Data pertaining to the network parameters is used by the communications microcontroller to address specific ones of associated relay outputs and to control the operational status thereof in accordance with information contained within the data. By using the multi-drop communications network, the relay module is capable of controlling the various relay outputs in a remote fashion, and the number of control lines required for operating the individual action of the associated relay outputs is substantially reduced.

In the preferred embodiment, the communications microcontroller used within the relay module is capable of selectively operating under a network "slave" mode wherein network data activity is continuously monitored, pertinent data is received as it becomes available, and the received data is processed for addressing appropriate ones of the associated relay modules and realizing the requisite change in the operational status thereof.

In addition, the microcontroller is capable of being operated in a network "master" or "host" mode wherein data relevant to the addressable relay outputs is requested from the network, accepted at the multi-drop network when the requested data becomes available, and subsequently processed to effectively control appropriate ones of the associated relay outputs based on the network parameters defined by the requested data.

The capability of the addressable relay module to operate in the above-noted field-selectable network master/slave modes functionally eliminates the need for an additional network master unit in the case of single point-to-point applications. The addressable relay module, in accordance with this invention, effectively provides relaying functions for electronic circuit breakers by providing user flexibility in determining the specific network parameters which control the output state of the system relays. At the same time, system cost is substantially reduced by a corresponding reduction in the control lines required for mapping the relay outputs to corresponding network parameters.

BRIEF DESCRIPTION OF THE DRAWINGS

Other objects and advantages of the present invention will become apparent upon reading the following detailed description and upon reference to the drawings in which.

Figure 1:
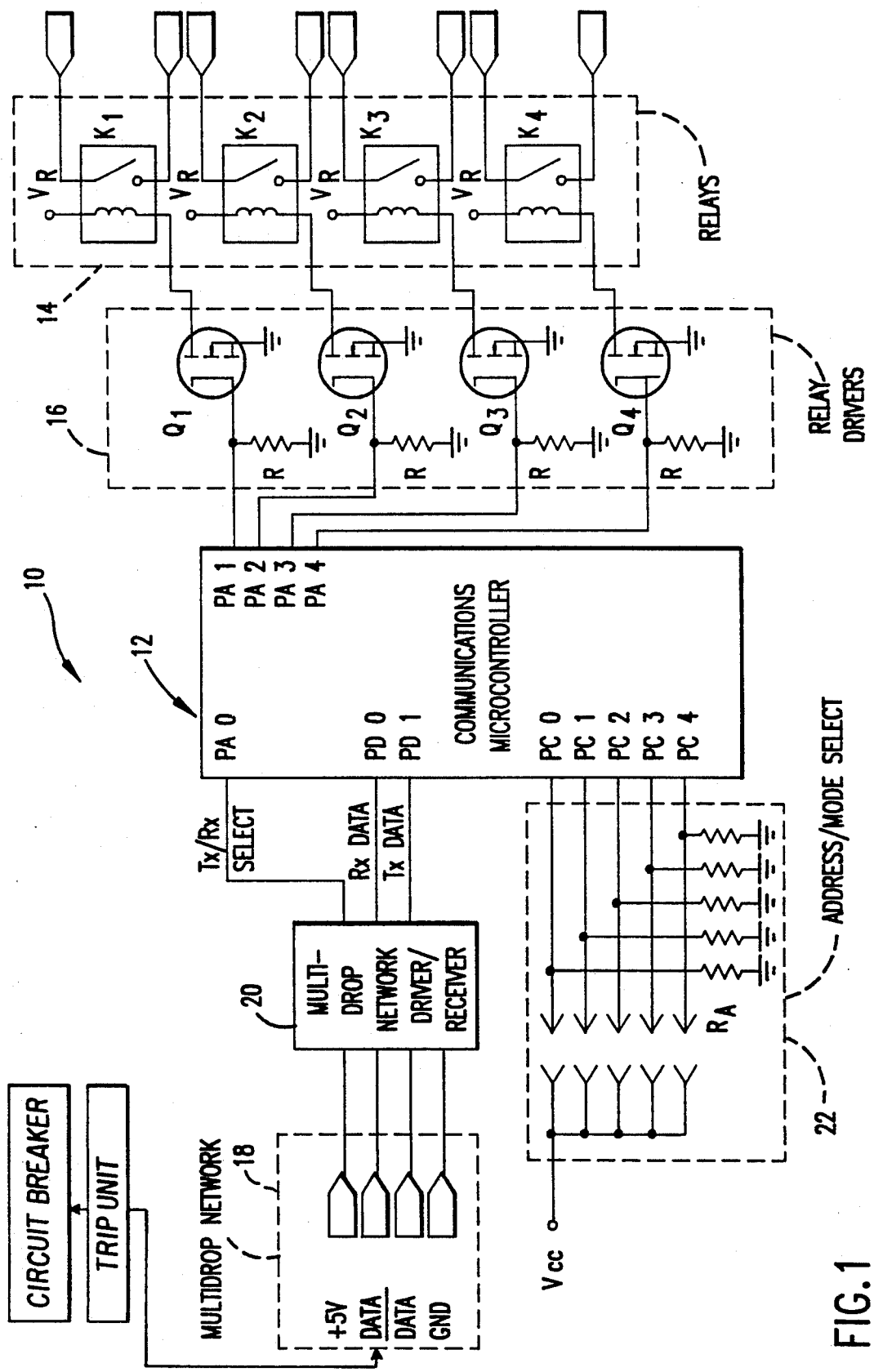
FIG. 1 is a detailed block diagram of an addressable relay module, in accordance with a preferred embodiment of the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a block diagram illustrating the structural details of an addressable relay module 10, in accordance with a preferred embodiment of the present invention. The relay module 10 essentially comprises a communications microcontroller 12 adapted to receive control data pertaining to system network parameters from a conventional trip unit or the like (not shown) used to monitor pertinent operating parameters of the overall electrical distribution system which is to be protected. The microcontroller 12 processes the received data and, on the basis of control information contained therein, controls the operational status of a plurality of electrical relays disposed within a relay unit 14 linked thereto. Each of the electrical relays in the relay unit 14 is linked to the communications microcontroller 12 through a corresponding plurality of relay drivers 16 which are directly actuated by the controller 12 in order to realize the desired operational status of the associated relay 14.

According to a preferred embodiment, system data, including pertinent network parameters, are received from a trip unit at the communications microcontroller 12 through a multi-drop network 18 which includes lines dedicated to the transmission and reception of data, in addition to standard power supply and ground signal points.

A preferred arrangement for such a multi-drop network and the associated communications protocol is disclosed in the above-referenced Haun, et al. U.S. Pat. application Ser. No. 07/585,449, the disclosure in which is incorporated by reference herein. Such an arrangement essentially receives data from an electronic trip unit and clusters, reformats and distributes the information on the multi-drop network using a microcomputer and an associated communications protocol which, inter alia, uses software "handshaking" to realize data exchange between various system devices without conflicts.

The microcomputer stores and monitors the trip unit data, which typically includes information related to the cause of a trip based on regularly processed operating condition data such as monitored current and voltage levels. In addition, the trip unit data also includes configuration data for a circuit breaker based on field-adjustable characteristics such as trip levels relative to standard ratings. More importantly, the trip unit data may include information on imminent tripping of a circuit breaker which can advantageously be used by devices linked to the protective system.

With conventional arrangements, all the above type of trip unit data related to a circuit breaker is sent out as a continuous, uni-directional stream of data. The multi-drop network arrangement shown in the Haun, et al. application provides a communication interface having an associated handshaking protocol whereby data related to a plurality of circuit breakers can be collected and transferred without data collisions and conflicts to one or more devices such as personal computers or other communication devices.

Where information related to imminent circuit breaker tripping is available from a trip unit, the output of a multi-drop network of the above-noted type can be used to activate one or more relays associated with a circuit breaker for realizing predefined functions (such as activation of an alarm light, bell or display) related to the fact that the breaker is about to be tripped. The addressable relay module illustrated at FIG. 1 functions to efficiently relay trip unit information of this type related to one or more circuit breakers to selected ones of one or more relays associated with the circuit breakers by means of an efficient addressing arrangement.

Returning now to FIG. 1, the multi-drop communications network 18 is linked to the communications microcontroller 12 through a network driver/receiver unit 20 which essentially functions to realize the requisite transmission or reception of system data between the multi-drop network 18 and the microcontroller 12. More specifically, the network driver/receiver unit 20 is linked to the microcontroller 12 through receive ($R_X$) data and transmit ($T_X$) data lines respectively linked to pins PD-0, PD-1 on an appropriate port (here, Port D) of the microcontroller 12.

These data lines are used for transmission and reception of data depending on the status of a control signal on a transmit/receive ($T_X/R_X$) Select line linking the network driver/receiver 20 to a pin PA-0 on Port A of the microcontroller 12.

In accordance with a preferred embodiment, the communications microcontroller 12 is adapted to control the operational status of a relay unit 14 containing four separate electrical relays $K_1$, $K_2$, $K_3$, and $K_4$ through a corresponding plurality of associated relay drivers consisting respectively of transistors $Q_1$, $Q_2$, $Q_3$, $Q_4$. The relays and associated relay drivers are powered by a voltage $V_R$ while each of the relay drivers has an associated bias resistance R and is linked to corresponding connecting pins PA-1, PA-2, PA-3, and PA-4 on Port A of the microcontroller 12. It will be noted that activation of specific ones of these pins on the microcontroller 12 activates corresponding ones of the relay driver transistors $Q_1$–$Q_4$ which, in turn, activates corresponding ones of the associated electrical relays in order to render the operational status thereof active.

It should be noted that the addressable relay module 10 shown at FIG. 1 is adapted to control the operational status of a plurality of electrical relays associated with a particular circuit breaker within the overall protective system. Accordingly, as many addressable relay means are provided as there are circuit breakers having associated electrical relays or the like which are to be controlled on the basis of operating condition information related to the circuit breakers.

In the arrangement of FIG. 1, the multi-drop network 18 essentially relays trip unit information related to the plurality of circuit breakers comprising the protective system. In order to configure a particular addressable relay module 10 for being controlled by trip information corresponding to a particular circuit breaker, an address/mode select circuit 22 is provided. The address/mode select circuit 22 includes a plurality (five, according to a preferred embodiment) of lines which are connected to corresponding pins PC-0 through PC-4 on an appropriate data port (here, Port C) on the communications microcontroller 12. Each of these lines is capable of being selectively powered by a voltage source $V_{CC}$ in order to be activated thereby in conjunction with an associated load resistance $R_A$. Specific ones of the address select lines can be activated depending on the specific address corresponding to the circuit breaker to which the relay module 10 is expected to respond. With four dedicated address select lines (PC-0-PC-3, in FIG. 1), the equivalent of 16 different addresses may be uniquely specified.

When data from any system circuit breaker is received by the communications microcontroller 12, the address information associated therewith is initially compared to the address defined by the status of the address select lines; the received information is used to control the associated electrical relays $K_1$–$K_4$ only if the compared address information is found to match. Effective and conveniently selectable addressing of the plurality of electrical relays is thus realized in correspondence with the operational status of a predefined circuit breaker.

It should be noted that a set of relays may also be controlled in accordance with the operational information of more than one circuit breaker by assigning identical addresses to those circuit breakers. In addition, a specific activated status of the address select lines may be designated for rendering a relay module receptive to operating condition information from all circuit breakers comprising the protective system.

In accordance with a feature of the present invention, the communications microcontroller 12 is capable of selectively operating under a network "slave" mode wherein network data activity is continuously monitored, pertinent trip unit data is continuously received as it becomes available, and the received data processed for addressing appropriate ones of the associated relay modules and realizing the requisite change in the operational status of the electrical relays.

In addition, the microcontroller 12 is also capable of being operated in a network "master" or "host" mode wherein data relevant to the operation of the addressable relay modules is requested from the multi-drop network, accepted when the requested data becomes available, and subsequently processed to appropriately control the operational status of the associated relays based on the circuit breaker operating condition information or network parameters defined by the received data.

Definition of the particular network mode (slave or host) in which the communications microcontroller is operated at a given time is realized by dedicating one of the select lines in the address/mode select circuit 22 (the Mode Select line) to define the slave or master mode depending on whether the line is activated or not. In the preferred embodiment, the dedicated Mode Select line corresponds to the line connecting to pin PC-4 of Port C.

The following section addresses the operational details pertaining to the addressable relay module shown at FIG. 1. When the relay module 10 is powered up, the communications microcontroller 12 resets the system variables and enables the multi-drop communications port for the network 18. The status of the dedicated Mode Select line—in the preferred embodiment, the status of bit 4 of Port C—in the address/mode select circuit 22 is then tested for a logical one ("1") state. The microcontroller 12 enters into a network host mode if bit 4 is found to be in a logical 1 state. The controller enters into a network slave mode if bit 4 is found to be a logical zero ("0").

In the network slave mode, the communications microcontroller 12 continuously monitors network data activity through the multi-drop network driver/receiver 20. As the differential data stream from the network is monitored, the microcontroller looks for a network address byte to appear. When the address byte is received, the byte is compared to the network address defined by the status of bits 0-3 of the address/mode select port (Port C). If the correct network address is received (i.e., the address of a circuit breaker corresponding to which the relays associated with the relay module 10 are expected to respond), the rest of the network data is received through the multi-drop network 18 and stored as it sequentially appears, until the complete data stream is received.

Subsequently, the received data stream is checksummed and tested for the presence of a "data write" from a trip unit. The data stream is not acted upon and discarded if either one of these tests fails. If the data stream is found to be valid, the relay control word contained in the data stream is written to the relay driver transistors $Q_1$–$Q_4$ through corresponding pins on port A of the microcontroller 12 to which the relay drivers are linked. The relay driver transistors then turn the relay coil current of the corresponding relays $K_1$–$K_4$ "on" if the bit written to them is a logical 1 or "off" if the bit is a logical 0. The communications microcontroller 12 subsequently returns to monitoring the network data activity.

In the network host mode, the communications microcontroller 12 activates a network request interval timer (not shown) which provides a predefined time delay prior to initiating a request. When the timer times out, the microcontroller 12 enables the transmit mode ($T_X$ Select) of the multi-drop network driver/receiver 20 by first writing a logical 1 to bit 0 of port A (PA-0) on the controller 12 and then transmitting a request for a data packet. The microcontroller 12 subsequently writes a logical 0 to bit 0 of port A (PA-0) so as to enable the receive mode ($R_X$ Select), and waits for a reply from the multi-drop network 18. When the network reply is received, the resulting data stream is checksummed and tested for a "data write" from a trip unit.

The subsequent address comparison and relay activation based on the received information is identical to that in the network slave mode. After the associated relays have been activated, the communications microcontroller 12 again waits for the network interval timer to time out and the process described above is repeated.

In implementing an arrangement of the above type, the software communications protocol must support the requisite output to the mappable relay contacts. It is important that relay control be accomplished in a timely fashion. In practical terms, it is generally required that a relay contact react within a time period of one (1) second from receipt of an associated command at the addressable relay module. Accordingly, for the address/select arrangement shown in FIG. 1, it becomes necessary that the communications microcontroller be capable of cycling through the sixteen (16) predefined bank address within 1 second and that data requests and responses be made within a period of 62.5 mSec.

In order to expedite the contact reaction time, relay contact commands are specified within the header of the communications protocol. According to a preferred embodiment using an 8-bit command format, relay contact commands use a format wherein the bottom four (4) bits designate the status of the four (4) associated relay contacts while the upper four (4) bits designate the 16 bank addresses. The status (logical 1 or 0) of each of the bottom four bits defines whether the corresponding contact is to be closed or open. Each bank address corresponds to the trip unit address that is dedicated to a particular mappable relay contact and multiple contacts are mapped to a single trip unit address (and the function associated therewith) by setting the address for the contacts to correspond to the desired trip unit address.

The above arrangement is particularly advantageous in applications where it is desirable to monitor the status of various functions of electronic trip units for activating corresponding relay contact outputs. Illustrative functions which may be monitored are "long-time pick up," phase unbalance, ground fault trip, and "watchdog" trip. By using the above addressable relay arrangement, a relatively small number of lines dedicated to driving relay contacts are required for mapping the relay outputs to desired system functions.

The use of the communications microcontroller within the addressable relay module is particularly advantageous since it can conveniently be used to define the specific functions which are mapped to the relay output lines. In addition, by using a mapping arrangement wherein each system function is capable of being mapped to any relay output, it becomes possible to map more than one system function to a given output. Mapping could, for instance, be accomplished by defining a table that defines the output contact destination for each pertinent system function so that a set of predefined relay outputs are activated by data related to correspondingly addressed system functions. Alternatively, the output contacts may themselves be provided with a map of associated functions. Although such an approach would be relatively easier to configure by the user, each contact output would be capable of supporting only a limited number of system functions.

Figure 2:
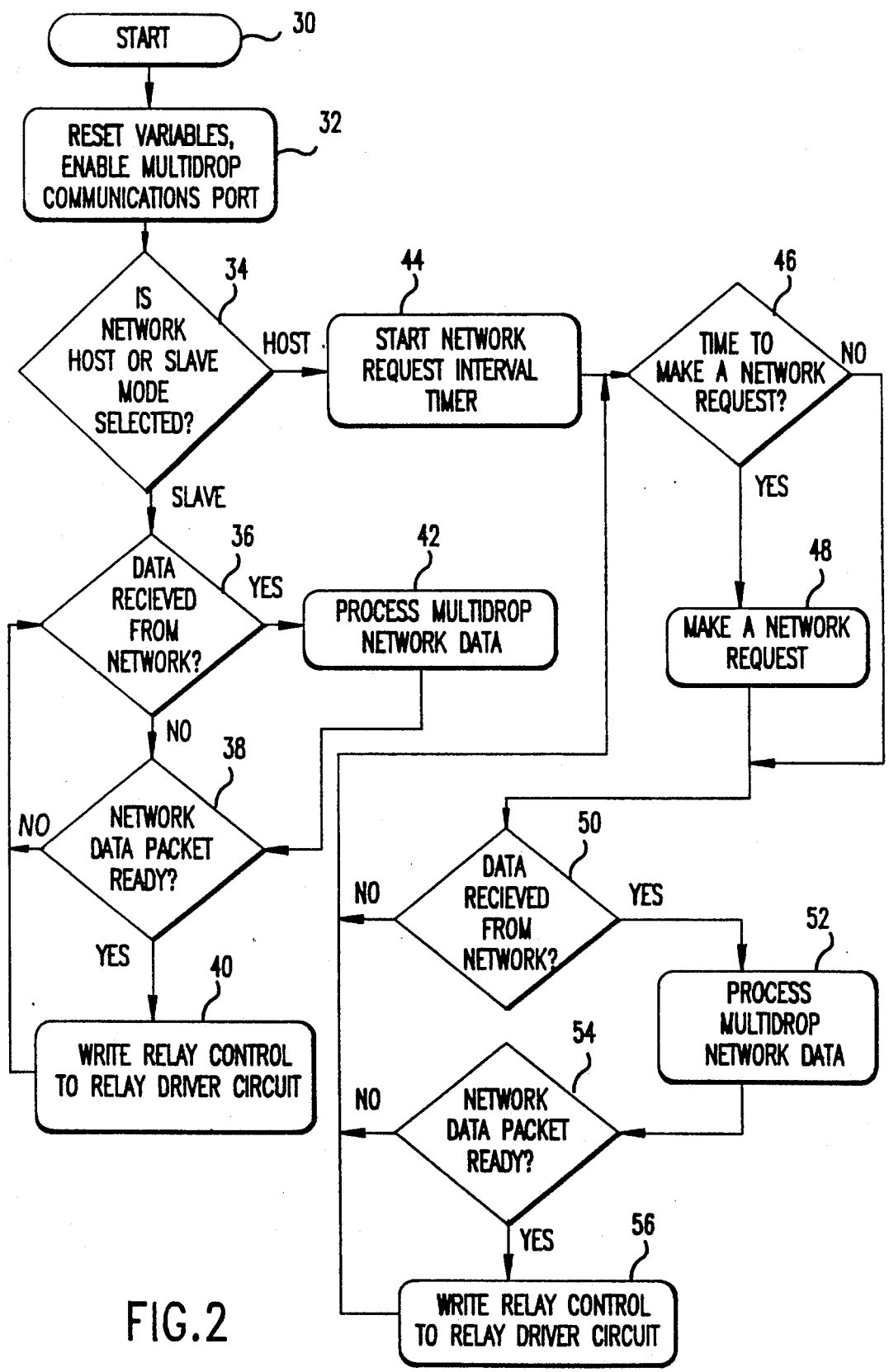
FIG. 2 is a flowchart illustrating the overall sequence of operations involved in a practical implementation of the functions of the relay module shown at FIG. 1.

Referring now to FIG. 2, there is shown a flowchart illustrating the operational sequence involved in implementing desired functions of the addressable relay module of FIG. 1. As shown therein, system operation is initiated at step 30 and at step 32 system variables are reset and the multi-drop communications port is enabled. Next, at step 34, a check is made to see if the communications microcontroller in the module is set to operate in the network host or the network slave mode.

If the slave mode is found to have been selected, step 36 is accessed where a determination is made as to whether or not data has been received from the network. If the answer at step 36 is found to be negative, step 38 is accessed where a check is made to see if the complete network data packet is ready. If, however, the answer at step 36 is found to be positive, i.e., data has in fact been received from the network, step 42 is accessed where the multi-drop network data is processed in accordance with the procedure to be explained in detail below. Subsequently, step 38 is accessed again.

If the check at step 38 reveals that a network data packet is ready, step 40 is accessed where appropriate relay control signals are written to the relay driver circuit and the system returns to step 36 to continue monitoring the reception of data from the network. Step 36 is also accessed if the answer at step 38 is found to be negative.

If the check at step 34 reveals that the host mode of operations has been selected, step 44 is accessed where the network request interval timer is activated. Subsequently, at step 46, a check is made to see if the timer has timed out, i.e., if it is time to make a network request. If the answer is positive, the network request is initiated at step 48.

Following step 48, as well as following a negative answer at step 46, step 50 is accessed where a check is made to see if data has been received from the network. If the answer is positive, the multi-drop network data is processed at step 52 in accordance with a procedure to be described below in detail. Subsequently, step 54 is accessed where a determination is made as to whether or not a network data packet is ready. If the answer is positive, step 56 is accessed where appropriate relay control signals are written to the relay driver circuit in order to realize the required change in the operational status of the associated relays. Following step 56, as well as following the presence of a negative answer at steps 50 and 54, step 46 is accessed again for reiterating the subsequent steps described above.

Figure 3:
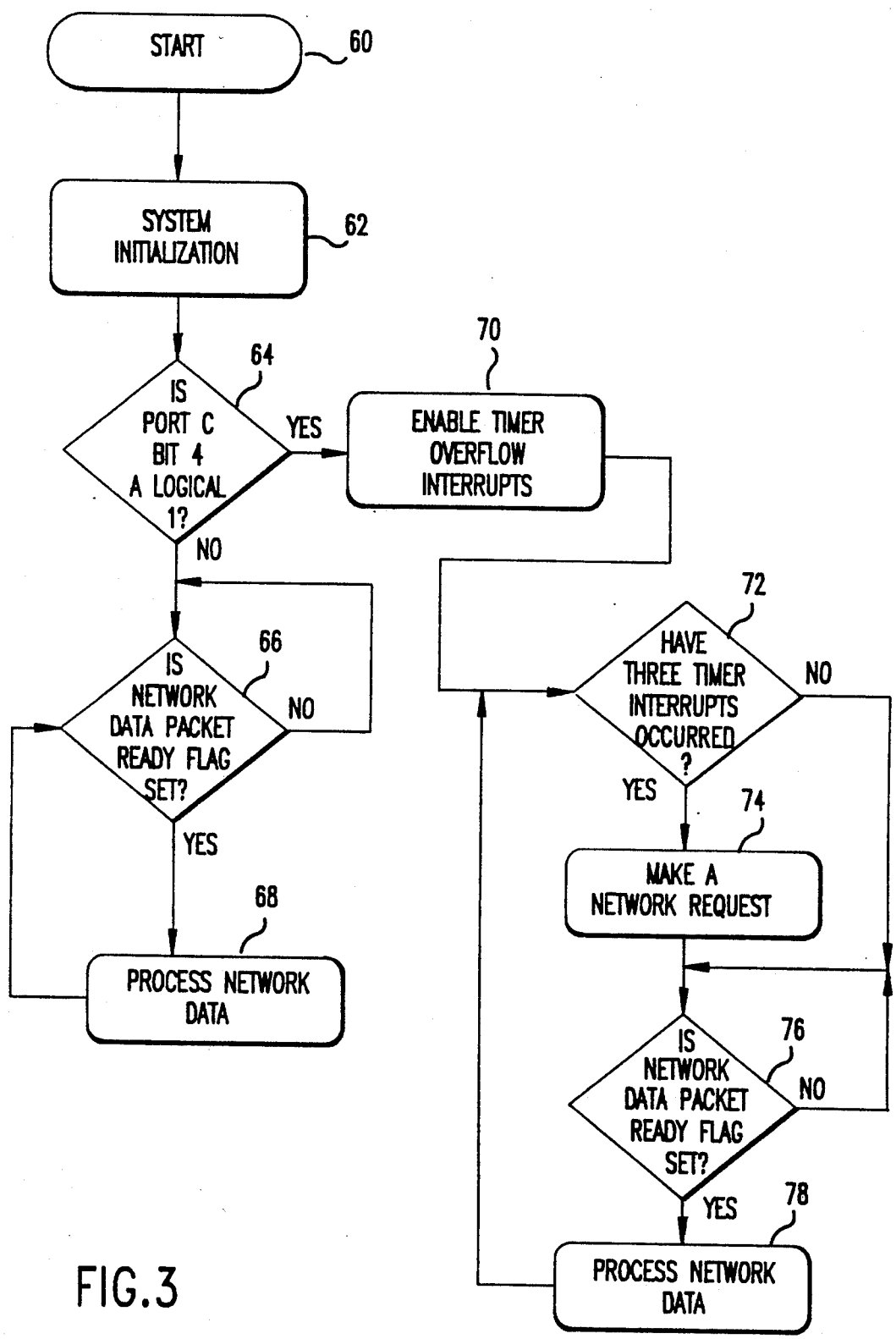
FIG. 3 is a flowchart of the sequence of operations involved in the main program loop for operating the relay module of FIG. 1.

Referring now to FIG. 3, there is shown a more detailed flowchart of a preferred main program for realizing the required functional operation of the addressable relay module. The main program is initiated at step 60 and at step 62 system initialization is performed in accordance with a procedure to be described in detail below. Next, at step 64, bit 4 of Port C of the communications microcontroller in the relay module is tested for the presence of a logical 1. If the answer at step 64 is negative, it is an indication that the system is set for operation in the network slave mode. Subsequently, at step 66, a check is made to see if the network data packet is ready in accordance with the status of a corresponding ready flag. The system continues this check until a positive answer is realized. At that time, step 68 is accessed where the network data is processed. Subsequently, step 66 is accessed again and monitoring of the availability of a network data packet is continued.

If the answer at step 64 is found to be positive, it is an indication that the system is set for operation in the network host mode and step 70 is accessed where the system interval timer overflow interrupts are enabled. Subsequently, step 72 is accessed where a determination is made as to whether or not a predefined threshold number (preferably, three) of timer interrupts have occurred. If the answer is positive, it is a confirmed indication that the network request interval timer has timed out. Accordingly, a network request is made at step 74.

Subsequently, step 76 is accessed where a check is made to see if a network data packet is ready in accordance with the status of an associated ready flag. If the flag is found to be set, the network data is processed at step 78 following which the system returns to step 72 for continuing with monitoring the status of the timer. The monitoring of the presence of a network data packet at step 76 is continued if the answers at either step 72 or 76 are found to be negative.

Figure 4:
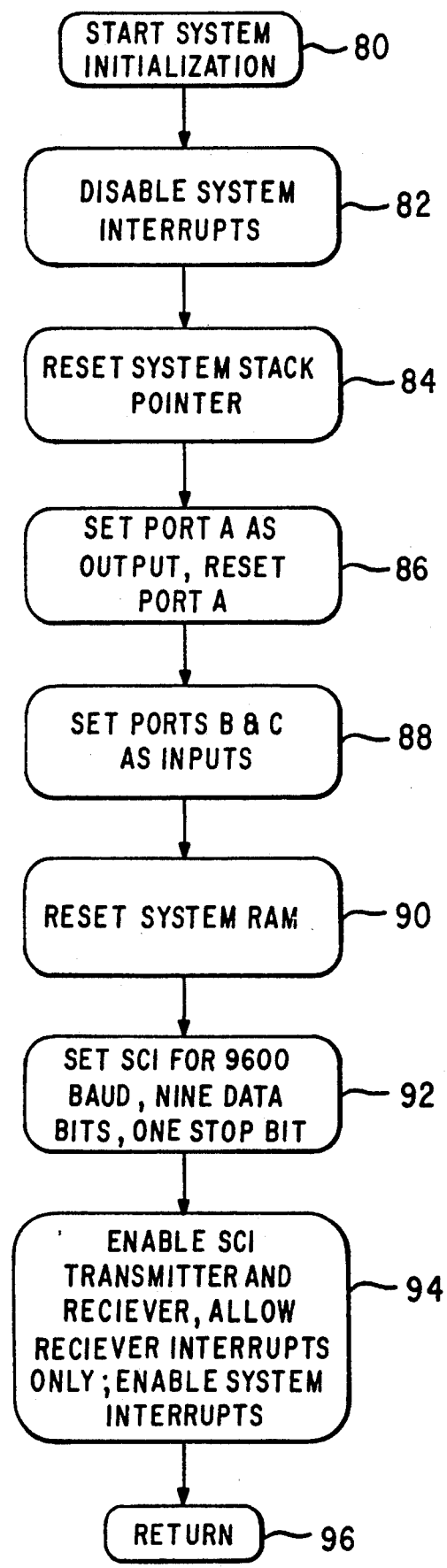
FIG. 4 is a flowchart of the sequence of operations involved in system initialization for the relay module.

FIG. 4 shows a flowchart illustrating the sequence of operations for a system initialization routine for the addressable relay module, in accordance with a preferred embodiment of the present invention. System initialization is started at step 80 and, subsequently, at step 82, all system interrupts are disabled. Next, the system stack pointer is reset at step 84 and, at step 86, a specific port, here Port A, of the communications microcontroller is designated as the output port and is reset.

Next, at step 88, specific ports, here Ports B and C, of the communications microcontroller in the relay module are designated as input ports. The system memory (RAM) is next reset at step 90. Subsequently, at step 92, the Serial Communications Interface (SCI) associated with the communications microcontroller is set for the specific Baud rate (preferably, 9600) at which data exchange is to occur to and from the multi-drop communications network. Related protocol bit designations associated with data transfer (preferably, 9 data bits with 1 stop bit) are also made at this point.

Next, at step 94, the SCI transmitter and receiver are enabled and the system is configured for allowing receiver interrupts only. All system interrupts are enabled at this point and the system then returns to the main program at step 96.

The specific manner in which the SCI transmitter and receiver functions are activated is well known and accordingly not described herein. A preferred protocol for implementing such functions to realize the requisite data transfer is covered by the earlier-referenced Haun, et al. patent application.

Figure 5:
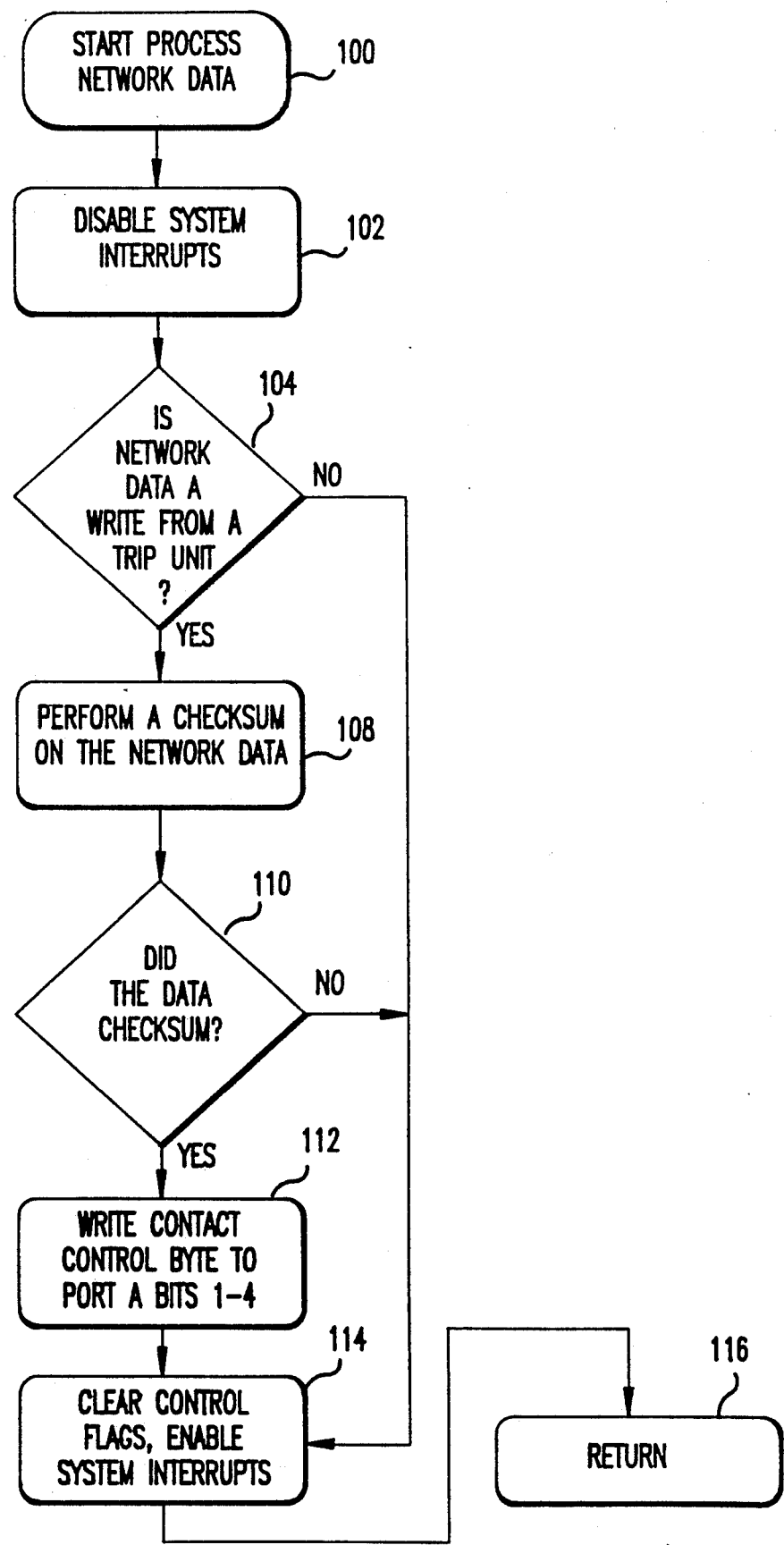
FIG. 5 is a flowchart illustrating the flow sequence involved in processing network data.

FIG. 5 shows a flowchart illustrating the sequence of operations associated with a data processing routine in accordance with a preferred arrangement of this invention.

The processing of network data is initiated at step 100 and system interrupts are disabled at step 102. Subsequently, at step 104, a check is made to see if the network data constitutes a "write" from a trip unit. If the answer is found to be positive, step 108 is accessed where a checksum is performed on the network data.

Next, at step 110, a check is made to see if the data checksum at step 108 realized a positive answer. If the answer at step 110 is positive, step 112 is accessed where the relay contact control byte in the network data is written to appropriate bits (here, bits 1-4) of the output port (here, Port A) on the communications microcontroller. Subsequently, at step 114, all control flags are cleared and the system interrupts are enabled following which the system returns at step 116. Step 114 is also accessed following negative answers at steps 104 and 110.

Figure 6:
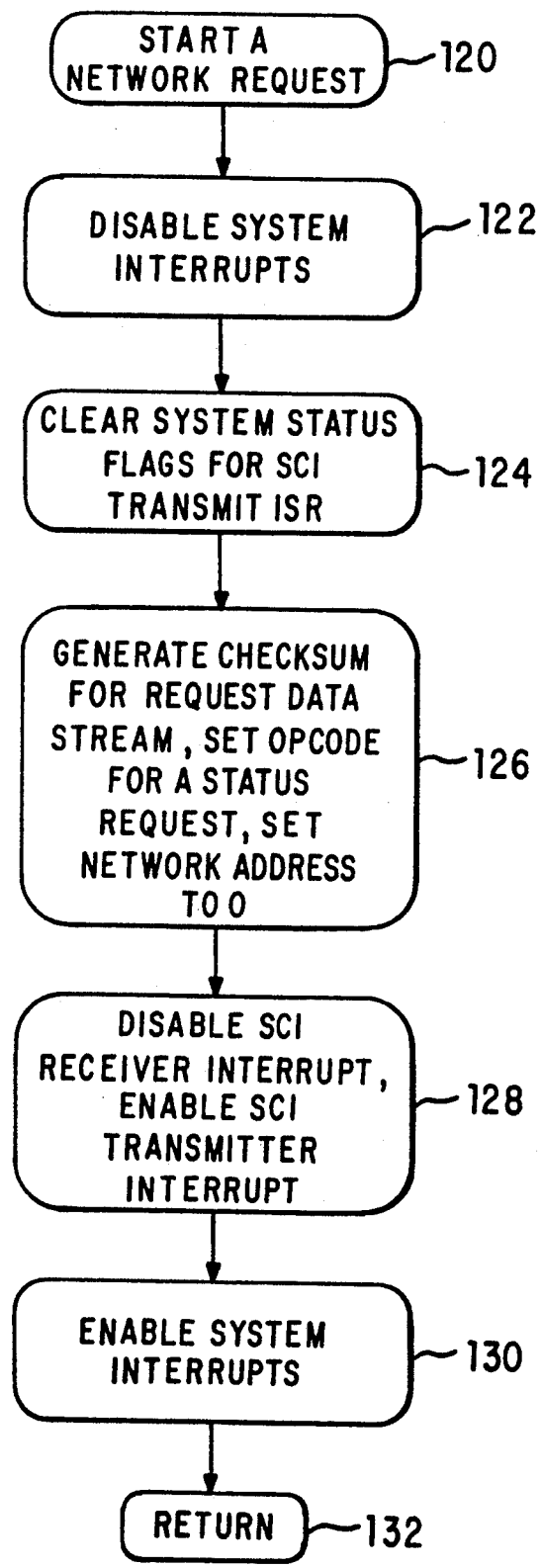
FIG. 6 is a flowchart of the sequence of operations involved in executing a network request.

Referring now to FIG. 6, there is shown a flowchart illustrating the operational sequence involved in performing a network request when the relay module is operating under a network host mode. As shown therein, a network request is initiated at step 120. Next, at step 122, system interrupts are disabled and, at step 124, system status flags are cleared for the SCI. In addition, an Interrupt Service Request (ISR) is transmitted at this point.

Subsequently, at step 126, a checksum is generated for the requested data stream. In addition, the appropriate operation (OPCODE) is set for a status request, and the network address is set to "0".

Next, at step 128, the SCI receiver interrupt is disabled while the SCI transmitter interrupt is enabled. Subsequently, all system interrupts are enabled at step 130 and the system returns to the main program at step 132.

We claim:

1. An addressable relay module for controlling a plurality of relay outputs associated with a protective circuit breaker system on the basis of operational data from a fault-powered circuit breaker trip unit and related to one or more circuit breakers within the protective system, the data including address data specifying the circuit breaker to which the data corresponds, said relay module comprising:
   at least one fault-powered circuit breaker trip unit;
   a plurality of relays having relay outputs whose operational status is controlled on the basis of operational data corresponding to particular ones of said circuit breakers; and
   means for receiving said circuit breaker operational data from a multi-drop communication network and processing said data to address appropriate ones of said relays on the basis of said address data contained therein, in order to change the operational status of associated relay outputs on the basis of corresponding operational data.

2. The addressable relay module according to claim 1 further including relay drivers corresponding to said relays, said drivers being linked to and controlled by said data receiving and processing means in order to correspondingly change the operational status of said relay outputs.

3. The addressable relay module according to claim 1 wherein said operational data for said circuit breakers is received from an electronic trip unit through a multi-drop communications network, and said relay module includes driver/receiver means for realizing the transfer of said operational data between said multi-drop network and said data receiving and processing means.

4. The addressable relay module according to claim 3 further including means for specifying the address of one or more circuit breakers the operational data corresponding to which is to be used for addressing and controlling said relays.

5. The addressable relay module according to claim 1 wherein said data receiving and processing means is a communications microcontroller adapted to operate in conjunction with said driver/ receiver means in
   (i) a slave mode wherein said multi-drop communications network is monitored for incoming data, said operational data is received when it becomes available, and said received data is processed to address and control appropriate ones of said relays specified by said address data contained therein; and
   (ii) a host mode wherein operational data is requested from said multi-drop network, said requested data is received when it becomes available, and said received data is processed to address and control appropriate ones of said relays specified by said address data contained therein.

6. A digital protective circuit breaker system comprising:
   a plurality of circuit breakers;
   a fault-powered trip unit adapted to monitor operational data pertaining to said circuit breakers and generate corresponding trip unit output data;
   a communications adapter unit for receiving storing and processing said trip unit data and transmitting pertinent operational data, including address data specifying the particular one of said circuit breakers to which the data corresponds, over a multi-drop communications network; and
   an addressable relay module comprising:
   a plurality of relays having relay outputs whose operational status is controlled on the basis of operational data corresponding to particular ones of said circuit breakers; and
   means for receiving said circuit breaker operational data from said multi-drop network and processing said data to address appropriate ones of said relays on the basis of said address data contained therein, in order to correspondingly change the operational status of associated relay outputs on the basis of corresponding operational data.

7. The digital protective system of claim 6 wherein said addressable relay module further comprises relay drivers corresponding to said relays, said drivers being linked to and controlled by said data receiving and processing means in order to correspondingly change the operational status of said relay outputs.

8. The digital protective system of claim 6 wherein said addressable relay module further includes driver/receiver means for transferring operational data between said multi-drop network and said data receiving and processing means.

9. The digital protective system of claim 8 wherein said addressable relay module further includes means for specifying the address of one or more circuit breakers the operational data corresponding to which is to be used for addressing and controlling said relays.

10. The digital protective system of claim 8 wherein said data receiving and processing means in said addressable relay module is a communications microcontroller adapted to operate in conjunction with said driver/receiver means in
    (i) a slave mode wherein said multi-drop communications network is monitored for incoming data, said operational data is received when it becomes available, and said received data is processed to address and control appropriate ones of said relays specified by said address data contained therein; and
    (ii) a host mode wherein operational data is requested from said multi-drop network, said requested data is received when it becomes available, and said received data is processed to address and control appropriate ones of said relays specified by said address data contained therein, 11. A method of processing trip unit data corresponding to operational data for one or more circuit breakers for controlling an associated plurality of relay outputs in a digital protective circuit breaker system, said method comprising the steps of:
    providing a plurality of relays having relay outputs whose operational status is controlled on the basis of operational data corresponding to particular ones of said circuit breakers, said operational data including address data specifying the particular one of said circuit breakers to which the data corresponds;
    receiving, storing and processing said trip unit data and transmitting pertinent operational data, including said address data specifying the particular one of said circuit breakers to which the data corresponds, over a multi-drop communications network; and receiving said circuit breaker operational data from said multi-drop network and processing said data to address appropriate ones of said relays on the basis of said address data contained therein, in order to change the operational status of associated relay outputs on the basis of corresponding operational data.

12. The trip unit data processing method according to claim 11 wherein a communications microcontroller is used for receiving and processing said operational data, said microcontroller being operated in conjunction with a driver/receiver means for realizing the transfer of operational data to and from said multi-drop network.

13. The trip unit data processing method according to claim 12 further including the steps of comparing address data associated with received operational data with a predefined address of one or more circuit breakers the operational data corresponding to which is to be used for addressing and controlling said relays, and realizing the desired addressing and control of relays only if the compared address data is found to match.

14. The trip unit data processing method according to claim 1 wherein said communications microcontroller is operated in conjunction with said driver/receiver means in
  (i) a slave mode wherein said multi-drop communications network is monitored for incoming data, said operational data is received when it becomes available, and said received data is processed to address and control appropriate ones of said relays specified by said address data contained therein; and
  (ii) a host mode wherein operational data is requested from said multi-drop network, said requested data is received when it becomes available, and said received data is processed to address and control appropriate ones of said relays specified by said address data contained therein.

* * * * *